(12) United States Patent  (10) Patent No.: US 7,911,607 B2
Matsuura  (45) Date of Patent: Mar. 22, 2011

(54) LIGHT MEASURING DEVICE AND SCANNING OPTICAL SYSTEM

(75) Inventor: Koji Matsuura, Kanagawa (JP)

(73) Assignee: Sony Corporation, Tokyo (JP)

( * ) Notice: Subject to any disclaimer, the term of this patent is extended or adjusted under 35 U.S.C. 154(b) by 39 days.

(21) Appl. No.: 12/257,485

(22) Filed: Oct. 24, 2008

(65) Prior Publication Data

US 2009/0110333 A1 Apr. 30, 2009

(30) Foreign Application Priority Data

Oct. 30, 2007 (JP) .................... 2007-281369

(51) Int. Cl.
*G01J 3/30* (2006.01)
(52) U.S. Cl. ...................................... 356/317
(58) Field of Classification Search ............ 356/326, 356/317; 382/321
See application file for complete search history.

(56) References Cited

U.S. PATENT DOCUMENTS 7,158,226 B2 * 1/2007 Gfrorer et al. ............... 356/318
2004/0032581 A1 * 2/2004 Nikoonahad et al. ...... 356/237.2
2007/0258122 A1 * 11/2007 Chamgoulov et al. ........ 359/225

FOREIGN PATENT DOCUMENTS

JP 2004-093326 3/2004
* cited by examiner

*Primary Examiner* — Tarifur Chowdhury
*Assistant Examiner* — Abdullahi Nur
(74) *Attorney, Agent, or Firm* — SNR Denton US LLP

(57) ABSTRACT

A light measuring device is disclosed which can take in light from different portions of a plane light source efficiently to carry out measurement. The light measuring device for measuring light from a plane light source includes a spatial division device configured to carry out operation for successively taking in light from different portions of the plane light source. An optical condensing device condenses the light from the different portions of the plane light source taken in by the operation of the spatial division device. A detector receives the light condensed by the optical condensing device and outputs a signal corresponding to the received light.

7 Claims, 13 Drawing Sheets

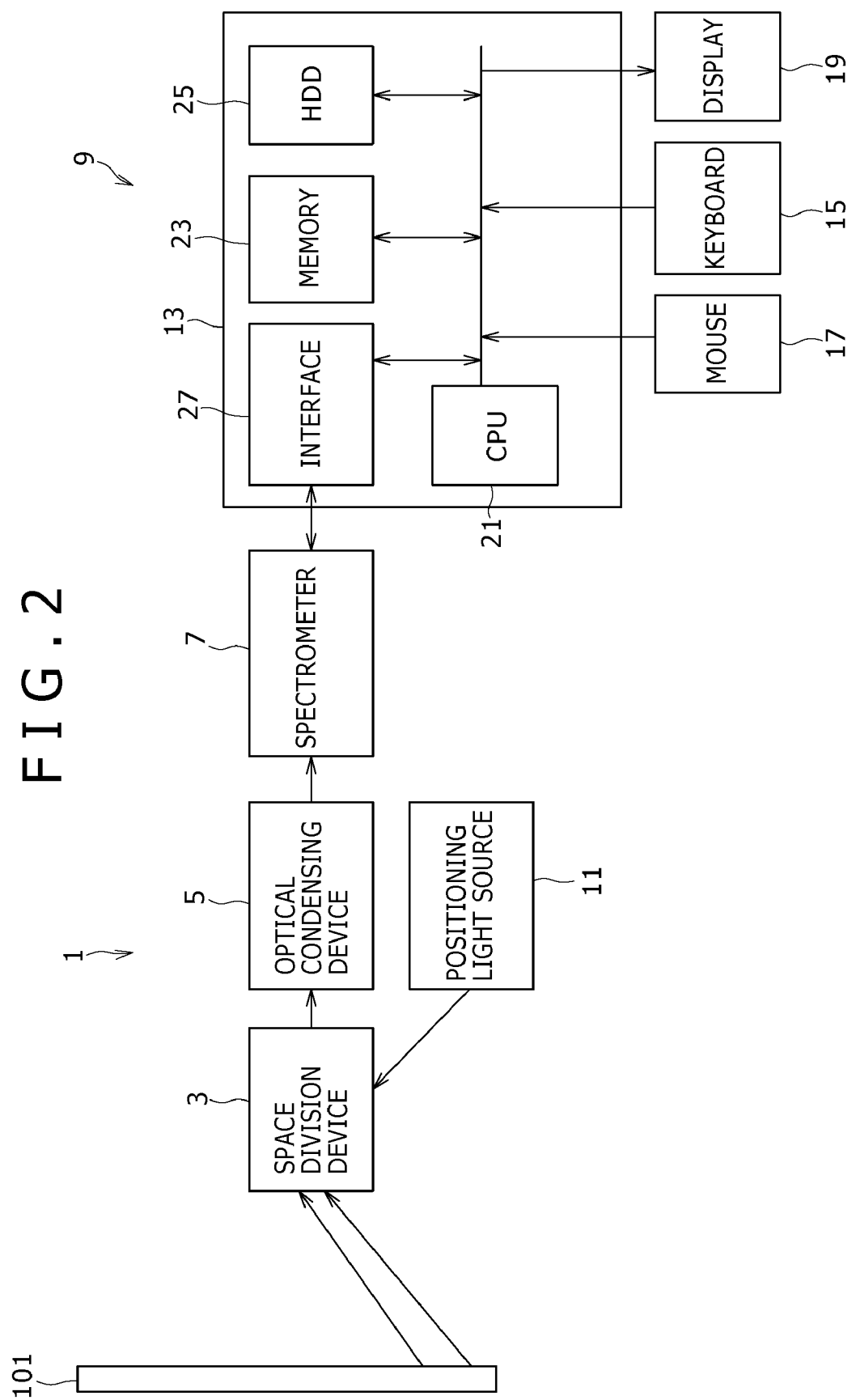

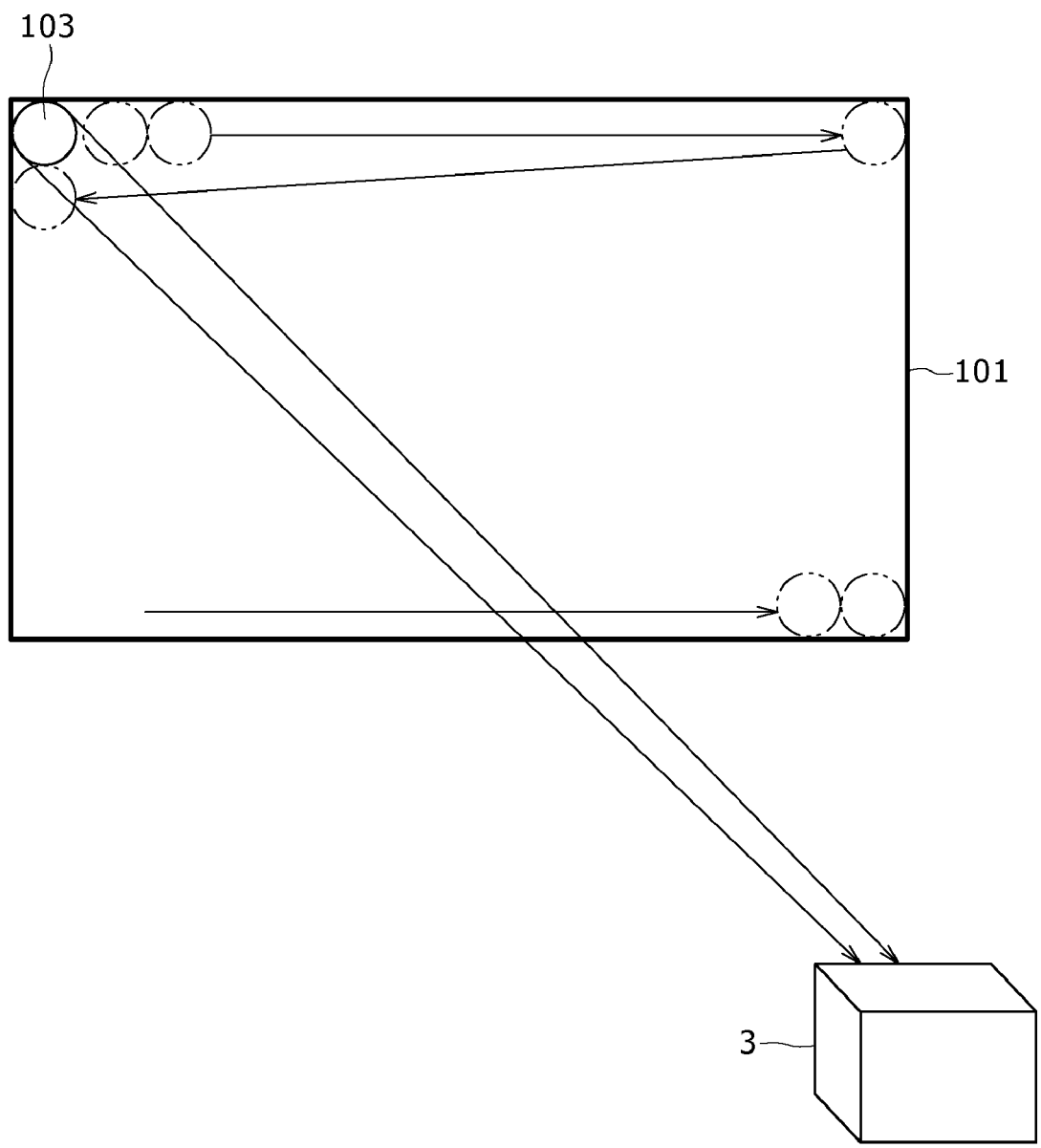

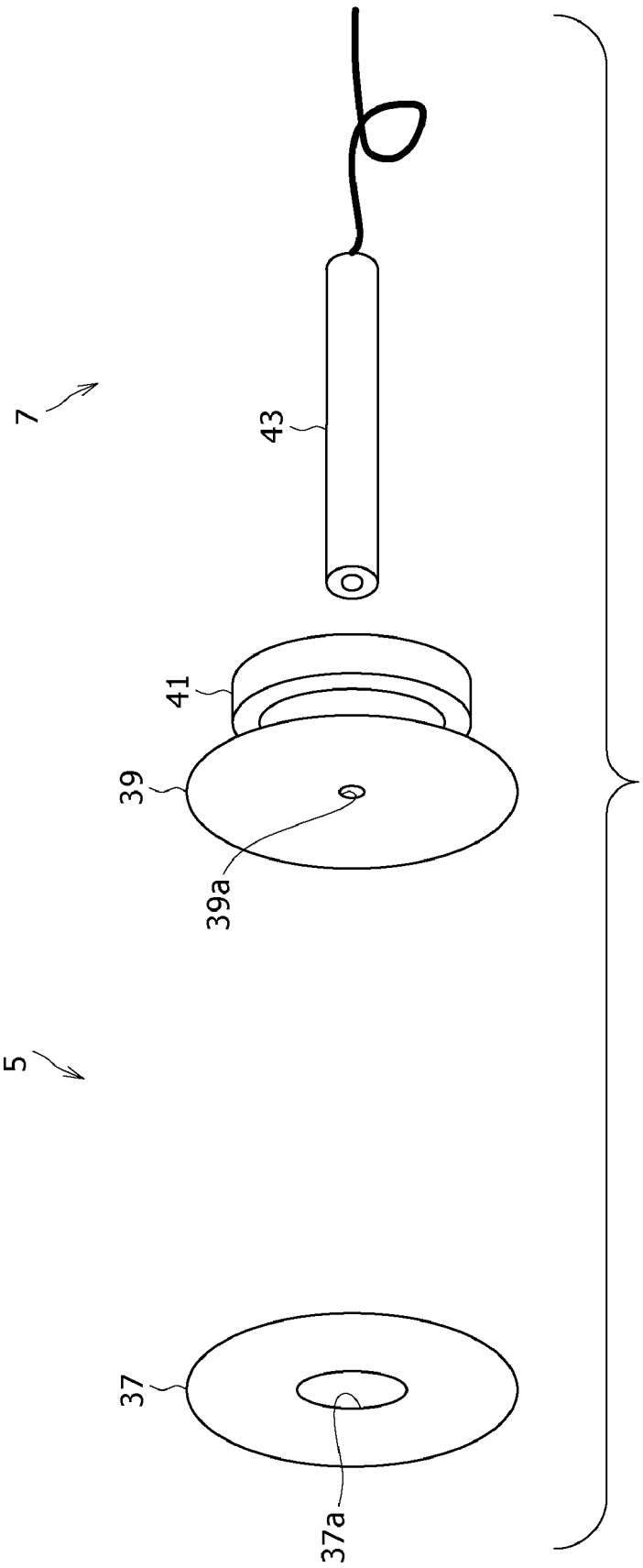

LIGHT MEASURING DEVICE AND SCANNING OPTICAL SYSTEM

CROSS REFERENCES TO RELATED APPLICATIONS

The present invention contains subject matter related to Japanese Patent Application JP 2007-281369, filed in the Japan Patent Office on Oct. 30, 2007, the entire contents of which being incorporated herein by reference.

BACKGROUND OF THE INVENTION

1. Field of the Invention

This invention relates to a light measuring device for measuring a quantity regarding light such as luminance, chromaticity or the like of a plane light source and a scanning optical system which can be utilized in the light measuring device.

2. Description of the Related Art

A technique is known wherein, in order to measure a luminance distribution, a chromaticity distribution or the like of a plane light source, a physical quantity or a psychophysical quantity such as luminance, chromaticity or the like at different portions of the plane light source such as a central portion, outer peripheral portions and so forth is successively measured. Japanese Patent Laid-Open No. 2004-93326. (hereinafter referred to as Patent Document 1) discloses a collection device for collecting optical information of a web such as a paper web. The collection device includes a galvano-mirror for successively deflecting light from different portions of the web to carry out scanning of the web, two slits for transmitting the light deflected by the galvano-mirror therethrough and, a spectrometer for spectralizing the light transmitted through the two slits. With the technique disclosed in Patent Document 1, measurement of light from a plane light source can be carried out from one position, that is, from a visual point.

SUMMARY OF THE INVENTION

In the technique disclosed in Patent Document 1, measurement of the luminance or the like of a plane light source cannot be carried out with sufficiently high accuracy. For example, while the size of the two slits is not described in Patent Document 1, there is the possibility that, in a cross section of light transmitted through the two slits, the amount of flux of the light on the center side may be great while the amount of flux of the light on the outer periphery side is small, resulting in failure to guarantee the accuracy in luminance measurement and so fourth. Further, if the size of the slits is reduced excessively, then the amount of flux of light which is blocked becomes so great that it becomes difficult to measure the light. Accordingly, when light from different portions of a plane light source is taken in to carry out measurement, it is important to suppress appearance of non-uniformity of the density of flux of light in a cross section of the light arising from an optical system for taking in light or to efficiently introduce light to a detector.

Therefore, it is demanded to provide a light measuring device for measuring a quantity regarding light such as luminance, chromaticity or the like of a plane light source and a scanning optical system which can be utilized for the light measuring device.

According to an embodiment of the present invention, there is provided a light measuring device for measuring light from a plane light source, includes a spatial division device configured to carry out operation for successively taking in light from different portions of the plane light source, an optical condensing device configured to condense the light from the different portions of the plane light source taken in by the operation of the spatial division device, and a detector configured to receive the light condensed by the optical condensing device and output a signal corresponding to the received light.

Preferably, the optical condensing device includes a first iris member having formed therein a first aperture which transmits the light from any of the different portions of the plane light source therethrough while defining a cross section of the light, a second iris member having formed therein a second aperture which has an aperture area smaller than that of the first aperture and transmits the light transmitted through the first iris member therethrough while defining a cross section of the light, and a condensing optical element configured to condense the light transmitted through the second iris member on a light receiving face of the detector.

As an alternative, the optical condensing device may include an iris member having formed therein an aperture which transmits the light from any of the different portions of the plane light source while defining a cross section of the light, and a telecentric lens configured to receive the light transmitted thereto from the iris member and be telecentric on the side thereof adjacent the iris member.

In this instance, preferably the light measuring device further comprises a relay optical element configured to condense the light outgoing from the telecentric lens on a light receiving face of the detector.

As another alternative, the optical condensing device may include a first iris member having formed therein a first aperture which transmits the light from any of the different portions of the plane light source while defining a cross section of the light, an objective optical element configured to condense the light transmitted through the first iris member, and a second iris member positioned at a focal point on the rear side of the objective optical element and having formed therein a second aperture which transmits the light condensed by the objective optical element while defining a cross section of the light.

In this instance, preferably the light measuring device further comprises a relay optical element configured to condense the light transmitted through the second iris member on a light receiving face of the detector.

Preferably, the light measuring device further comprises a diffuser configured to receive the light condensed by the optical condensing device and projected thereto, the detector being disposed in a spaced relationship by a predetermined distance from the diffuser such that a region of the diffuser in which light is projected is included in an angle with which the detector can take in the light.

Preferably, the light measuring device further includes a positioning light source capable of successively projecting light to the different portions of the plane light source in response to the operation of the spatial division device, and a control device capable of storing a position when the light from the positioning light source is projected on an index provided on the plane light source and configured to control the spatial division device such that the light from the different portions of the plane light source is successively deflected based on the stored position.

According to another embodiment of the present invention, there is provided a scanning optical system for partially extracting light from a plane light source, includes a spatial division device configured to successively take in the light from different portions of the plane light source, and an optical condensing device configured to condense the light taken in from the different portions of the plane light source by operation of the spatial division device.

With the light measuring device and the scanning optical system, light from different portions of a plane light source can be taken in efficiently to carry out measurement.

BRIEF DESCRIPTION OF THE DRAWINGS

FIG. 2 is a block diagram showing a general configuration of the light measuring device of FIG. 1;

FIG. 3 is a schematic view illustrating a function of a spatial division device of the light measuring device of FIG. 1;

FIG. 5 is a perspective view showing a configuration of an optical condensing device of the light measuring device of FIG. 1;

DETAILED DESCRIPTION OF THE PREFERRED EMBODIMENTS

First Embodiment

Figure 1:
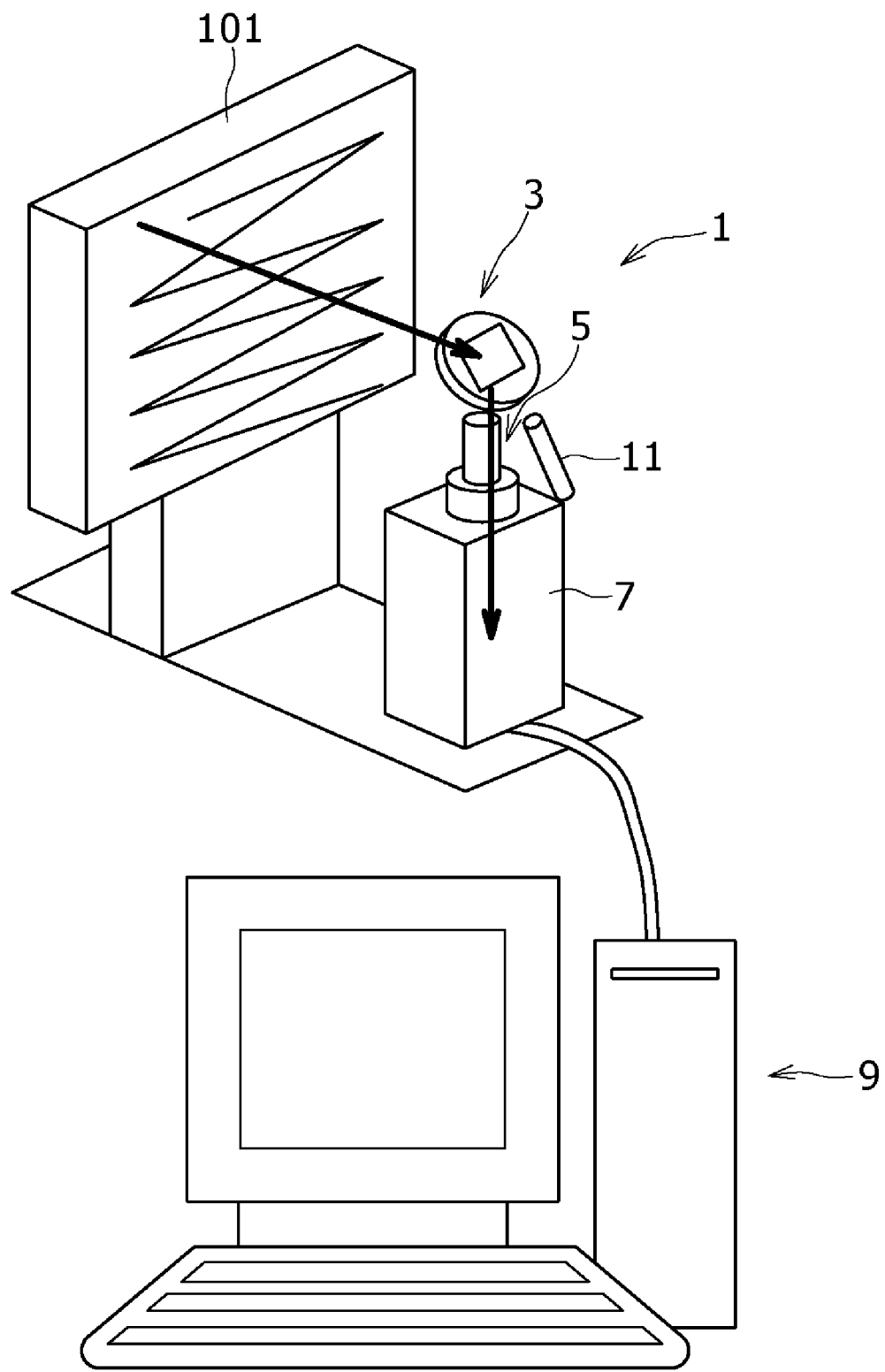
FIG. 1 is a schematic perspective view showing a general configuration of a light measuring device according to a first embodiment of the present invention.

FIGS. 1 and 2 show a general configuration of a light measuring device 1 according to a first embodiment of the present invention.

Referring to FIGS. 1 and 2, the light measuring device 1 is configured as a device for measuring a distribution of a quantity regarding light such as a light distribution, a chromaticity distribution or the like of a plane light source 101 which is an object of measurement. The plane light source 101 is a display device for adjusting the luminance for each of a plurality of pixels to carry out display such as, for example, a liquid crystal display unit, an organic EL display unit or the like.

The light measuring device 1 includes a spatial division device 3 for successively taking in light emitted from different portions of the plane light source 101, an optical condensing device 5 for condensing the light from the different portions of the plane light source 101 taken in by operation of the spatial division device 3, and a spectrometer 7 for receiving the light condensed by the optical condensing device 5 and outputting a signal in response to the received light. The signal outputted from the spectrometer 7 is inputted, for example, to a computer 9, and the computer 9 performs various mathematic operations such as calculation of luminance, chromaticity and so forth based on the signal inputted from the spectrometer 7. Further, the light measuring device 1 includes a positioning light source 11 for positioning a predetermined member hereinafter described in the spatial division device 3.

FIG. 3 illustrates a function of the spatial division device 3.

The spatial division device 3 successively introduces light from a plurality of measurement areas 103 configured by imaginarily dividing the plane light source 101 to the optical condensing device 5. It is to be noted that, as hereinafter described, the size and the shape of the measurement areas 103 are defined by the optical condensing device 5. While the size and the shape of the measurement areas 103 may be set suitably, for example, the shape of the measurement areas 103 is a substantially circular shape. Further, where the plane light source 101 is a display unit, the size of the measurement areas 103 is set to a size obtained by imaginarily dividing the plane light source 101 into 31 (horizontal direction)×17 (vertical direction) portions. For example, where the plane light source 101 is a 40-inch display unit, the diameter of the measurement areas 103 is approximately 30 mm. Further, while the taking-in order or scanning direction upon taking in light from the plural measurement areas 103 may be set suitably, for example, the taking-in order is set such that the horizontal direction is a main scanning direction and the vertical direction is a sub scanning direction.

Figure 4A:
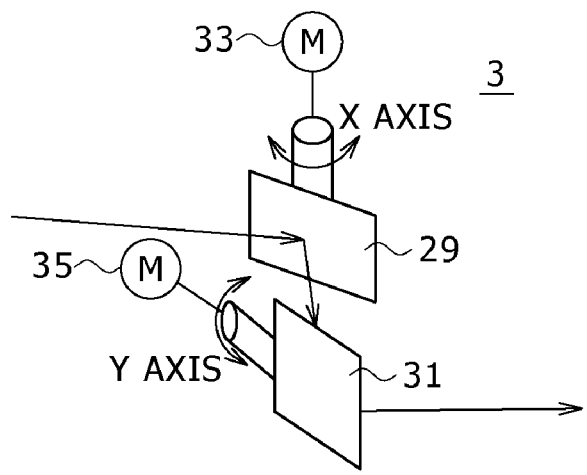
FIGS. 4A to 4C are schematic views showing particular examples of the spatial division device which implements the function illustrated in FIG. 3.

FIG. 4A shows a particular configuration of the spatial division device 3 which implements the function illustrated in FIG. 3.

Referring to FIG. 4A, the spatial division device 3 shown includes a galvano-mirror and further includes a first deflection mirror 29 for deflecting light from the plane light source 101 and a second deflection mirror 31 for deflecting the light deflected by the first deflection mirror 29.

The first and second deflection mirrors 29 and 31 are provided for rotation around rotational axes different from each other. The spatial division device 3 scans the plane light source 101 in the main scanning direction, for example, by rotation of the first deflection mirror 29 in an X-axis direction and scans the plane light source 101 in the sub scanning direction perpendicular to the main scanning direction, for example, by rotation of the second deflection mirror 31 in a Y-axis direction. It is to be noted that, where the plane light source 101 is a display unit, the main and sub scanning directions may be or may not be same as the main and sub scanning directions of the plane light source 101.

The first and second deflection mirrors 29 and 31 are driven, for example, by a first motor 33 and a second motor 35, respectively. Operation of the first and second motors 33 and 35 is controlled, for example, by the computer 9. The computer 9 controls the first motor 33 such that the first deflection mirror 29 continuously moves at a fixed rotational speed or intermittently moves over a fixed angle at a fixed time interval. Further, the computer 9 controls the second motor 35 such that the second deflection mirror 31 intermittently moves over a fixed rotational angle at a fixed time interval.

Figure 4B:
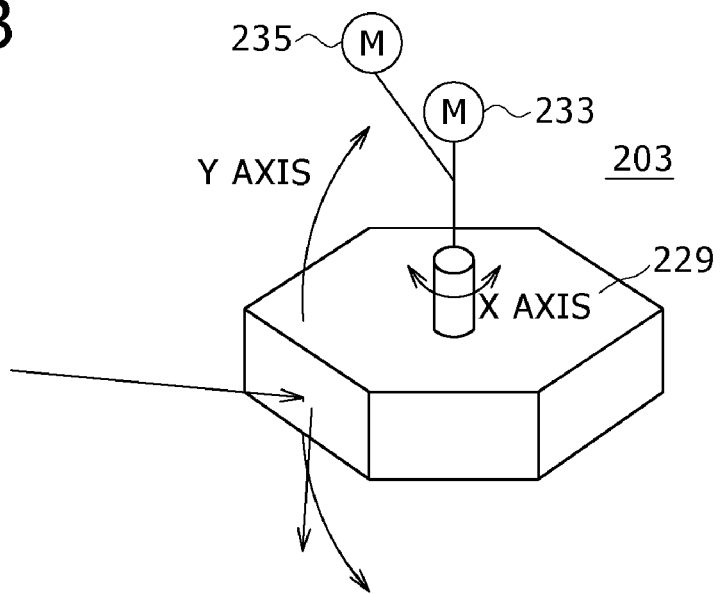
Figure 4C:
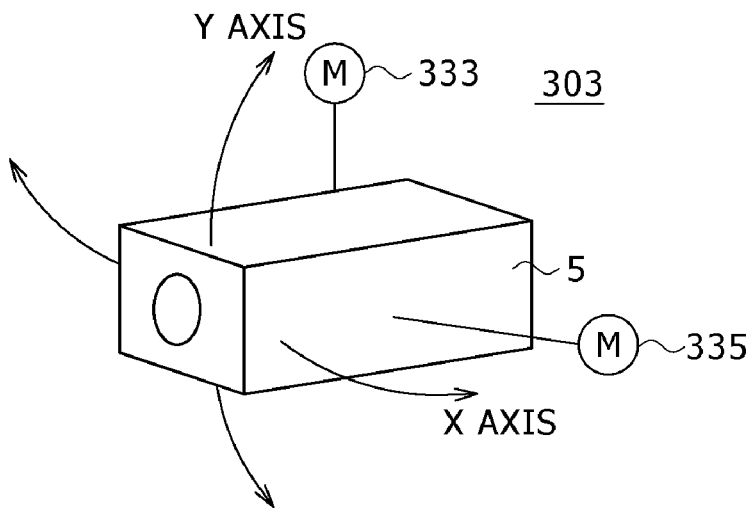

FIGS. 4B and 4C show different modifications to the spatial division device 3.

Referring first to FIG. 4B, the spatial division device 203 shown includes a polygon mirror 229. The spatial division device 203 scans the plane light source 101 in the main scanning direction, for example, by rotation of the polygon mirror 229 around the X axis, and scans the plane light source 101 in the sub scanning direction perpendicular to the main scanning direction by rotation of the polygon mirror 229 around the Y axis. The polygon mirror 229 is rotated, for example, by a first motor 233 and a second motor 235 provided for the individual axes, respectively.

Referring now to FIG. 4C, the spatial division device 303 shown is configured so as to change the direction of the optical condensing device 5. The spatial division device 303 includes a first motor 333 for rotating the optical condensing device 5 around the X axis to scan the plane light source 101 in the main scanning direction, and a second motor 335 for rotating the optical condensing device 5 around the Y axis to scan the plane light source 101 in the sub scanning direction perpendicular to the main scanning direction. It is to be noted that the spatial division device 303 may be of the type which moves the optical condensing device 5 in the main scanning direction and the sub scanning direction along the plane light source 101.

FIG. 5 shows a general configuration of the optical condensing device 5.

Referring to FIG. 5, the optical condensing device 5 includes a first iris member 37 having formed therein a first aperture 37a which transmits light from a measurement area 103 therethrough while defining the cross section of the light, a second iris member 39 having formed therein a second aperture 39a which transmits the light transmitted through the first iris member 37 therethrough while defining the cross section of the light, and a condensing lens 41 for condensing the light transmitted through the second iris member 39. It is to be noted that the optical condensing device 5 does not receive light from any other than the first aperture 37a.

Although the shape of the first aperture 37a and the second aperture 39a may be set suitably, it is, for example, a circular shape. The second aperture 39a has a diameter or an aperture area set smaller than that of the first aperture 37a. The condensing lens 41 is provided such that light emitted from the second aperture 39a is all introduced thereto. In other words, the condensing lens 41 has a diameter sufficiently great with respect to the diameter of the second aperture 39a and the distance from the second aperture 39a. The condensing lens 41 condenses the light incoming thereto to a light receiving face of the spectrometer 7.

The spectrometer 7 takes in light, for example, using an optical fiber 43, and the condensing lens 41 condenses light from the second aperture 39a to an end face of the optical fiber 43, that is, to the light receiving face of the spectrometer 7. At this time, the diameter of the condensed light at the end face position of the optical fiber 43 is smaller than the diameter of the end face of the optical fiber 43. It is to be noted that the diameter of the end face of the optical fiber 43 is, for example, 1 mm or less.

The optical fiber 43 guides only light having a predetermined incoming angle thereto into the inside of the spectrometer 7 by total reflection. In particular, the optical fiber 43 has a defined numerical aperture (NA) on the incoming side thereof. Therefore, the numerical aperture (NA) of the condensing lens 41 on the outgoing side is set so as to be smaller than the numerical aperture of the optical fiber 43 on the incoming side. Consequently, light condensed by the optical fiber 43 enters the optical fiber 43 without waste.

It is to be noted that the numerical aperture of the condensing lens 41 here is not the numerical aperture of the condensing lens 41 itself, but a numerical aperture of the entire combination of the first iris member 37, second iris member 39 and condensing lens 41, that is, of the entire optical condensing device 5. The galvano mirror which composes the spatial division device 3 is configured so as to have a sufficiently large area so that it may not have an influence on the numerical aperture of the optical condensing device 5.

Figure 6:
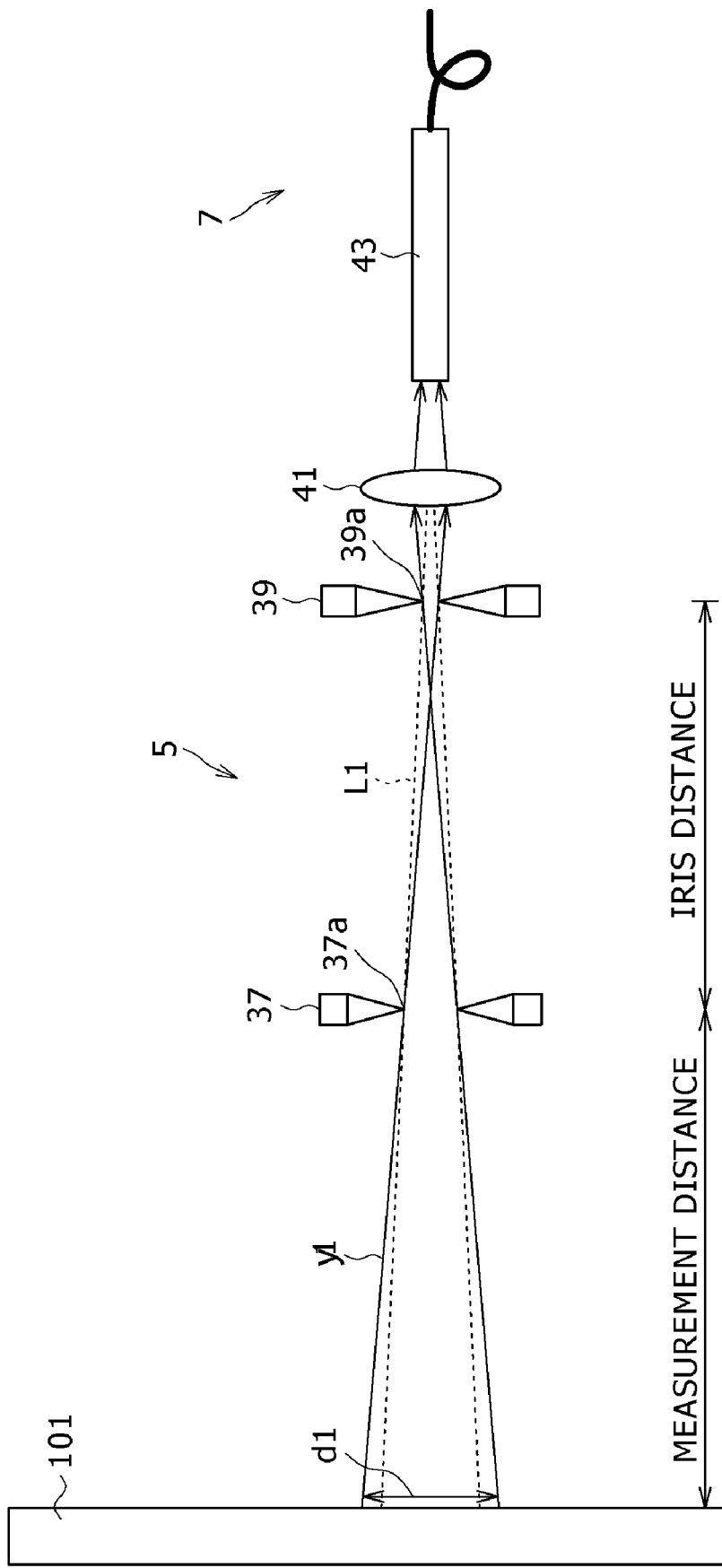
FIG. 6 is a view illustrating a light path in the optical condensing device of FIG. 5.

FIG. 6 schematically shows the light path in the optical condensing device 5. It is to be noted that the spatial division device 3 is omitted in FIG. 6.

Referring to FIG. 6, light of the plane light source 101 enters the condensing lens 41 for each measurement area 103 (FIG. 3) having a measurement diameter d1 as indicated by a solid line arrow mark y1. It is to be noted that the solid line arrow mark y1 indicates a ray of light advancing from an end portion of the first aperture 37a toward an end portion of the second aperture 39a on the opposite side to the end portion of the first aperture 37a with respect to the optical axis.

Here, the light incoming to the condensing lens 41 has a light flux density higher in a region indicated by broken lines L1. It is to be noted that the broken lines L1 indicate rays of light advancing from end portions of the first aperture 37a to end portions of the second aperture 39a on the same sides as the end portions of the first aperture 37a with respect to the optical axis.

Figure 7:
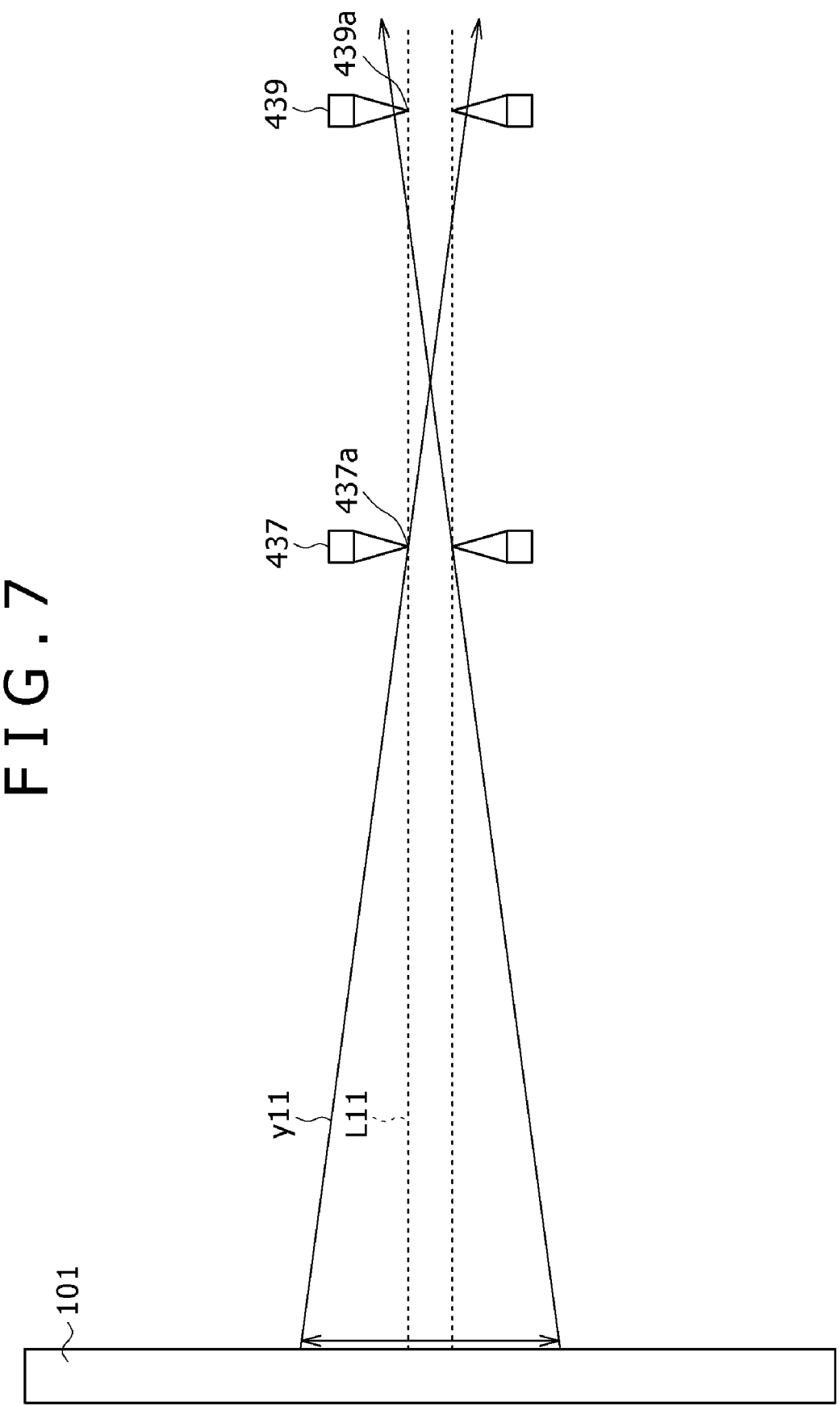
FIG. 7 is a view illustrating a light path in a comparative example.

FIG. 7 shows a comparative example of the optical condensing device.

Referring to FIG. 7, the optical condensing device of the comparative example shown includes a first iris member 437 and a second iris member 439 having a first aperture 437a and a second aperture 439a, respectively, which have an equal diameter. In this instance, the estrangement of solid line arrow marks y11 and broken line broken lines L11 is comparatively great. Accordingly, light only at part of a measurement area 103 is taken in by a comparatively great amount, and consequently, light whose light flux density is not uniform is projected from the second iris member 439, resulting in failure in assurance of the accuracy in measurement. If partial irregularity particularly occurs within the measurement diameter of the plane light source 101, then the error increases.

On the other hand, as the transmission region of light transmitted through the first iris member 37 and the second iris member 39 approaches a conical shape having the bottom at a measurement area 103 (FIG. 1), the estrangement of the solid line arrow marks y1 and the broken lines L1 decreases. The estrangement becomes minimum where the second aperture 39a of the second iris member 39 is formed as a pinhole (for example, of 0.3 to 0.6 mm) at which it forms a vertex of a conical shape. In this instance, the amount of the light which is transmitted through the second iris member 39 is small, and this makes measurement difficult. Therefore, in the present embodiment, while the diameter of the second aperture 39a is set to a size of a certain dimension, for example, to a size greater than the diameter of the light receiving face of the spectrometer 7, for example, greater than 1 mm, the diameter of the first aperture 37a is set greater than the second aperture 39a and besides light from the second aperture 39a is all introduced into the optical fiber 43 by means of the condensing lens 41, thereby to achieve improvement of the accuracy in measurement. In order to allow light to be taken in efficiently, the diameter of the first aperture 37a and the second aperture 39a is set, for example, such that the diameter of the first aperture 37a is 4 mm and the diameter of the second aperture 39a is 2 mm, or the diameter of the second aperture 39a is 2 mm or more and the diameter of the first aperture 37a is equal to or greater than twice the diameter of the second aperture 39a.

In light measurement in such a case that two-dimensional spectral data of the plane light source 101 are acquired, to what dimension the measurement diameter d1 should be set is significant in regard to required measurement accuracy and so forth. Preferably, the measurement diameter d1 can be set to an arbitrary dimension in response to various situations such as an application or a standard of an object of measurement.

In spectral radiance meters at present, the measurement diameter d1 is determined generally in response to an angle in measurement, that is, an object distance in measurement.

In the optical condensing device 5 of the present embodiment, the solid angle for taking in light is determined depending upon the diameter of the first aperture 37a, the diameter of the second aperture 39a and the distance between the first aperture 37a and the second aperture 39a, that is, the iris distance in FIG. 6. If the distance between the plane light source 101 and the first aperture 37a, that is, the measurement distance in FIG. 6, is determined, then also the measurement diameter d1 is determined. Accordingly, by adjusting the diameter of the first aperture 37a, the diameter of the second iris member 39, the iris distance and the measurement distance, the measurement diameter d1 can be set to an arbitrary value. It is to be noted that, in the present embodiment, the energy of light to be taken into the spectrometer 7 is determined by the solid angle, and if the solid angle is fixed, then the luminance of the plane light source is not varied by the measurement distance. It is to be noted that, while the measurement distance may be set suitably, it is set, for example, approximately three times the height of the plane light source 101. In particular, where the plane light source 101 is a display unit of 40 inches having a height of approximately 50 cm, the measurement distance is set to approximately 1.5 m. It is to be noted that, in the case described hereinabove wherein the diameter of the first aperture 37a is 4 mm and the diameter of the second aperture 39a is 2 mm, where the measurement distance=1.5 m and the measurement diameter d1=30 mm are implemented, the iris distance is 346 mm.

The spectrometer 7 (FIG. 1) receives light from the optical condensing device 5, spectralizes the received light to determine spectra of the light, and outputs spectrum data of the spectra or luminance, chromaticity and so forth calculated based on the spectrum data as an electric signal. The spectrometer 7 includes, in addition to the optical fiber 43 described hereinabove, though not particularly shown, for example, a spectrometer in a narrow sense such as a monochromer, and a photoelectric converter such as a CCD device which receives the light spectralized by the spectrometer and outputs an electric signal representing an amount of the received light.

Referring now to FIG. 2, the computer 9 includes a main frame section 13 which receives a signal from the spectrometer 7 inputted thereto and carries out various mathematical operations. The computer 9 further includes a keyboard 15 and a mouse 17 which form an operation device for accepting an operation of the user and inputting a signal corresponding to the operation to the main frame section 13, and a display unit 19 for displaying an image in response to an image signal from the main frame section 13.

The main frame section 13 includes a CPU 21 for carrying out various mathematical operations, and a memory 23 including a ROM for storing programs to be executed by the CPU 21 and so forth and a RAM which functions as a working memory of the CPU 21. The main frame section 13 further includes a hard disk drive (HDD) 25 as an external storage device for storing programs to be executed by the CPU 21, results of measurement and so forth, and an interface 27 such as, for example, a USB interface for outputting a signal from the spectrometer 7 to the CPU 21.

The positioning light source 11 is formed, for example, from a laser pointer for projecting a laser beam. The positioning light source 11 projects a laser beam to the spatial division device 3. The laser beam is reflected by the second deflection mirror 31 of the spatial division device 3 and the first deflection mirror 29 and comes to the plane light source 101. Meanwhile, an index not shown is provided at a predetermined position of the plane light source 101. Accordingly, by driving the first deflection mirror 29 and the second deflection mirror 31 by means of the first motor 33 and the second motor 35 so that the laser beam is projected to the index, the plane light source 101 and the first deflection mirror 29 and second deflection mirror 31 can be positioned relative to each other.

The computer 9 stores in advance at which position of the plane light source 101 the index is provided. Further, the computer 9 stores the positions of the first deflection mirror 29 and the second deflection mirror 31, that is, the positions of the first motor 33 and the second motor 35, when the laser beam is projected to the index of the plane light source 101. Accordingly, the computer 9 can specify the positions of the first deflection mirror 29 and the second deflection mirror 31 with respect to the plane light source 101 from the position of the index of the plane light source 101 and the position of the index when the laser beam is irradiated upon the index and control operation of the first deflection mirror 29 and the second deflection mirror 31 so that the plane light source 101 is scanned appropriately.

It is to be noted that, although the index may be provided at a suitable position, it is provided, for example, at the four corners of the plane light source 101. The optical axis of the positioning light source 11 may be or may not be in alignment with the optical axis of the optical condensing device 5. Where the optical axis of the positioning light source 11 is in alignment with the optical axis of the optical condensing device 5, since the positions of the first deflection mirror 29 and the second deflection mirror 31 when the laser beam is projected to the index from the positioning light source 11 coincide with the positions of the first deflection mirror 29 and the second deflection mirror 31 when light from the index position is taken into the optical condensing device 5, respectively, the stored position information can be used as it is for mathematical operation when the plane light source 101 is scanned by the optical condensing device 5. On the other hand, where the optical axis of the positioning light source 11 and the optical axis of the optical condensing device 5 are not in alignment with each other, an offset amount may be measured in advance and used to convert the stored position information into position information to be used when light is to be taken into the optical condensing device 5. Where the spatial division device has the configuration shown in FIG. 4C wherein the optical condensing device 5 moves, the positioning light source 11 may be configured so as to move together with the optical condensing device 5.

The control of driving the first motor 33 and the second motor 35 so that the laser beam is projected to the index may be carried out through the inputting section such as the keyboard 15 by the user while the user determines through visual observation whether or not the laser beam is projected to the index. Or, the control may be carried out automatically by the computer 9 using a sensor which detects information for determining whether or not the laser beam is projected to the index and inputs a result of the detection to the computer 9.

Figure 8:
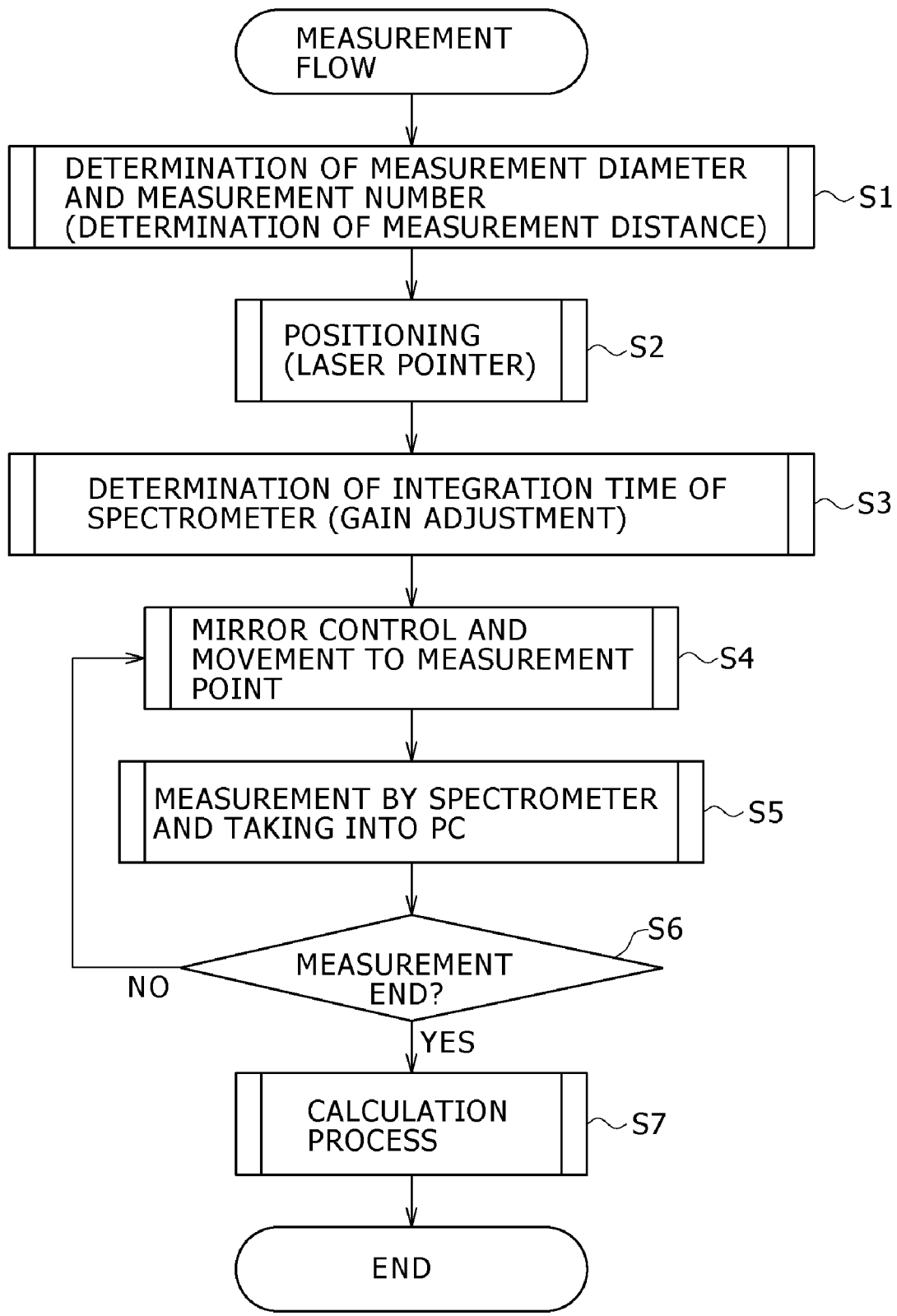
FIG. 8 is a flow chart illustrating a measurement procedure by the light measuring device of FIG. 1.

FIG. 8 illustrates a measuring procedure by the light measuring device 1.

Referring to FIG. 8, first at step S1, the measurement distance is determined to determine the measurement diameter d1. By the determination of the measurement diameter d1, the division number or measurement number of the plane light source 101 is determined. Then, the plane light source 101 and the light measuring device 1 are positioned relative to each other so that the actual measurement distance becomes equal to the determined measurement distance, and various kinds of information necessary to scan the plane light source 101 to measure the size of the plane light source 101, the index position, the measurement diameter d1, the measurement number and so forth are inputted to the computer 9. It is to be noted that the positioning for setting the actual measurement distance to the determined measurement distance may be carried out by manual operation of the user or may be carried out automatically through driving of the plane light source 101 and/or the light measuring device 1 by means of a motor or the like. Further, some information such as the measurement diameter d1 or the measurement number may be calculated by the computer 9 based on the inputted information such as the measurement distance.

At step S2, positioning of the plane light source 101 and the spatial division device 3 is carried out using the positioning light source 11 formed from a laser pointer and so forth as described hereinabove. In other words, the relative position of the plane light source 101 to the light measuring device 1 is stored in the computer 9 to finalize coordinates of a position when the plane light source 101 is scanned.

At step S3, the integration time, that is, the exposure time, of the spectrometer 7 is determined. In particular, the time for which current generated by photoelectric conversion is accumulated into a capacitor is determined. The integration time is set short so that the scanning time may be minimized while it is sufficiently long to compensate for a delay of the response of the photoelectric conversion element and so forth to assure high accuracy.

At steps S4 and S5, operation of the spatial division device 3 is controlled by the computer 9 so that light from a predetermined measurement area 103 is taken into the spectrometer 7 through the optical condensing device 5 to carry out measurement of the light. Data of a result of the measurement are outputted to the computer 9. At step S6, it is decided whether or not the measurement is completed for all of the measurement areas 103. If it is decided that the measurement is not completed as yet, then the processes at steps S4 and S5 are repeated.

After the measurement for all of the measurement areas 103 is completed, the computer 9 carries out various calculation processes based on the data of the result of the measurement. For example, a luminance distribution, a chromaticity distribution and so forth are calculated. A result of the calculation is displayed on the display unit 19 and/or transferred to another computer or the like. Then, the measurement is ended.

A calibration operation of the light measuring device 1 is substantially similar to that of an existing spectral radiance meter. In particular, spectral sensitivity calibration and luminance sensitivity calibration are carried out so that the light measuring device 1 may exhibit a spectral characteristic and a luminance value of a standard light source which covers the visible light range of 380 nm to 780 nm.

According to the embodiment described above, the light measuring device 1 which measures light from the plane light source 101 includes the spatial division device 3 for successively taking in light from different portions of the plane light source 101, the optical condensing device 5 for condensing the light from the different portions of the plane light source 101 taken in by the operation of the spatial division device 3, and the spectrometer 7 for receiving the light condensed by the optical condensing device 5 and outputting a signal corresponding to the received light. Therefore, in comparison with an alternative case wherein light from the different portions of the plane light source 101 is selectively taken in only by intercepting light by means of a pinhole or the like and is used for measurement, the light from the different portions of the plane light source 101 can be selectively taken in efficiently by the condensation of the light. Further, the error by a dispersion of the density of light flux incoming to the light receiving face or by a like cause is suppressed, and consequently, the accuracy in light measurement is improved.

Further, the optical condensing device 5 includes the first iris member 37 having formed therein the first aperture 37a which transmits the light from the different portions of the plane light source 101 therethrough while defining the cross section of the light, the second iris member 39 having formed therein the second aperture 39a which has an aperture area smaller than that of the first aperture 37a and transmits the light transmitted through the first iris member 37 therethrough while defining the cross section of the light, and the condensing lens 41 for condensing the light transmitted through the second iris member 39 on the light receiving face of the spectrometer 7. Therefore, the shape formed by the light ray to be taken into the configuration which can define the solid angle can be formed closer to a conical shape to suppress the dispersion of the density of the light flux while the light flux of an amount sufficient to carry out measurement can be inputted to the spectrometer 7 as described hereinabove with reference to FIG. 6.

The light measuring device 1 includes the positioning light source 11 capable of successively projecting light to the different portions of the plane light source 101 by the operation of the spatial division device 3, and the computer 9 capable of storing the position when the light from the positioning light source 11 is projected to the index provided on the plane light source 101 and configured to control the spatial division device 3 based on the stored position so as to successively deflect the light from the different portions of the plane light source 101. Therefore, even if a physical positioning error occurs when the light measuring device 1 is installed into the plane light source 101, the error can be compensated for upon measurement.

It is to be noted that, in the embodiment described above, the spectrometer 7 is an example of a detector and the condensing lens 41 is an example of a condensing optical element while the computer 9 is an example of a control device and the combination of the spatial division device 3 and the optical condensing device 5 is an example of an optical measuring device.

Second Embodiment

Figure 9:
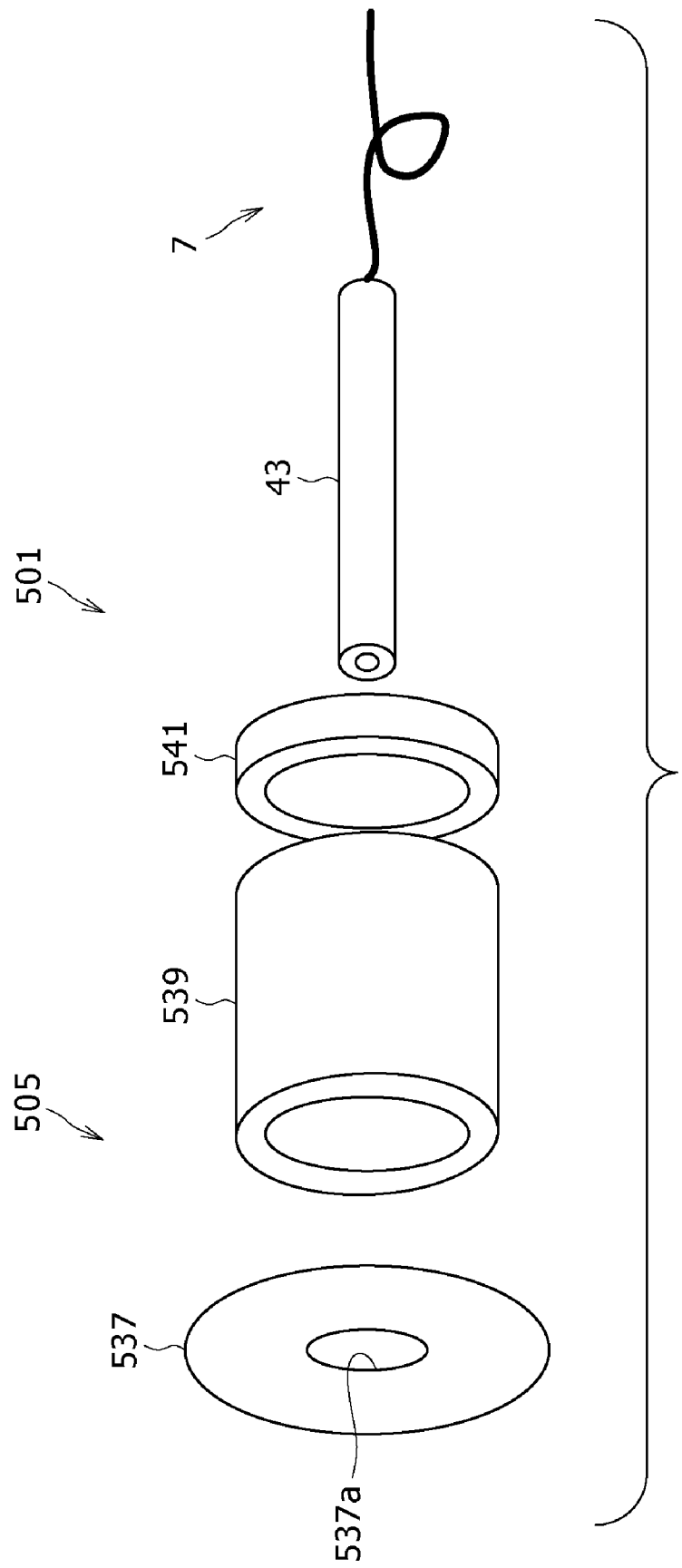
FIG. 9 is a perspective view showing a configuration of an optical condensing device of a light measuring device according to a second embodiment of the present invention.

FIG. 9 shows a general configuration of an optical condensing device 505 of a light measuring device 501 according to a second embodiment of the present invention. It is to be noted that the light measuring device 501 is common in configuration to the light measuring device 1 of the first embodiment except the configuration of the optical condensing device 505.

Referring to FIG. 9, the optical condensing device 505 includes an iris member 537 having formed therein an aperture 537a for transmitting light from different portions of the plane light source 101 therethrough while defining the sectional shape of the light. The optical condensing device 505 further includes an object side telecentric lens 539 to which the light transmitted through the iris member 537 is inputted, and a relay lens 541 configured to condense the light emitted from the object side telecentric lens 539 to the light receiving face of the spectrometer 7.

Figure 10:
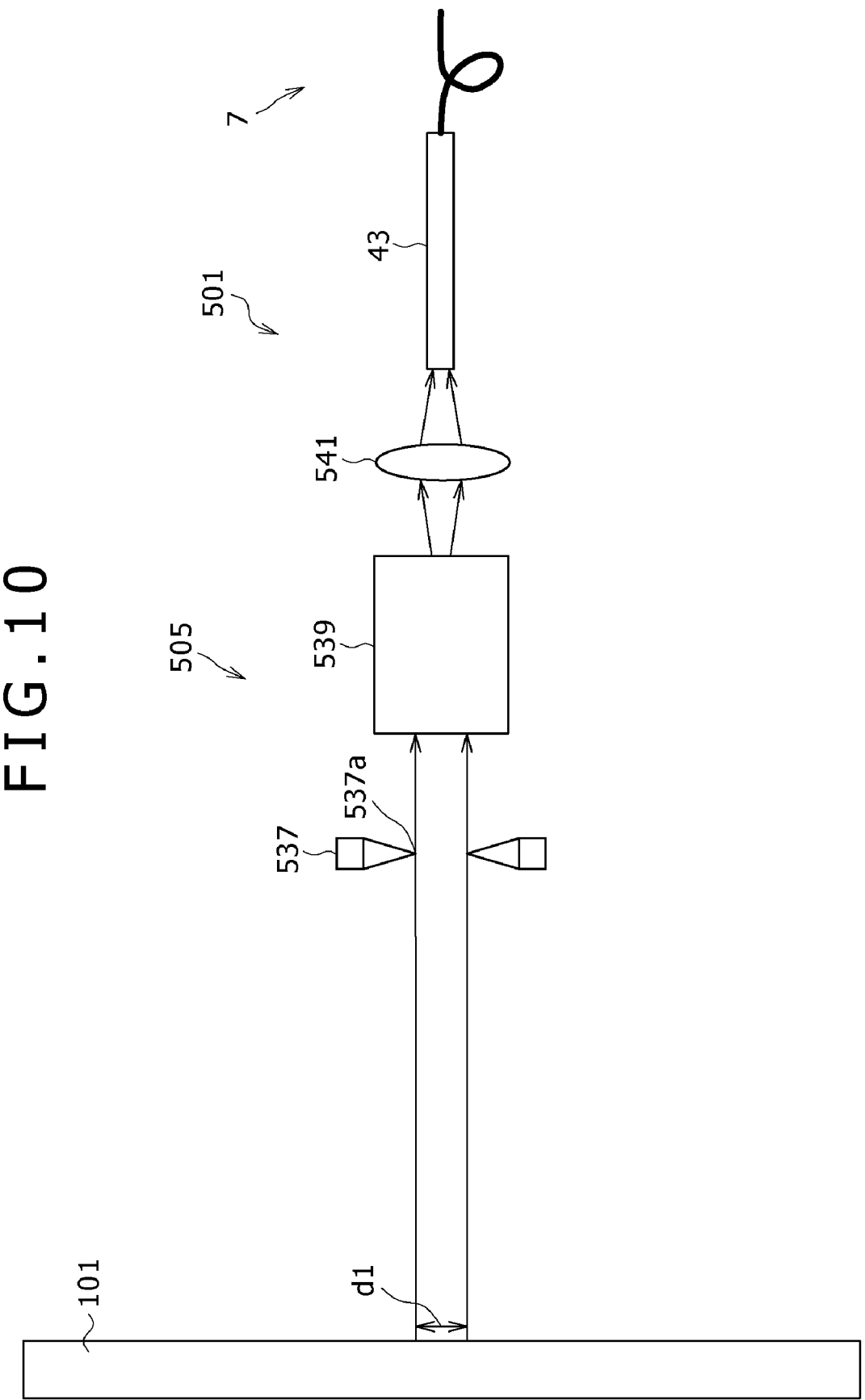
FIG. 10 is a view illustrating a light path in the optical condensing device of FIG. 9.

FIG. 10 shows a light path in the optical condensing device 505. It is to be noted that the spatial division device 3 is omitted in FIG. 10.

Referring to FIG. 10, the optical condensing device 505 does not receive light from any other than the aperture 537a.

The object side telecentric lens 539 is a lens for emitting only parallel light from within the light inputted thereto. Accordingly, the diameter of the aperture 537a of the iris member 537 remains as it is as the measurement diameter d1. The energy of light taken into the spectrometer 7 is determined by the diameter of the aperture 537a.

It is to be noted that the object side telecentric lens 539 has a diameter greater than that of the aperture 537a of the iris member 537. Further, the focus distance of the object side telecentric lens 539 is preferably equal to the distance to the plane light source 101.

The relay lens 541 condenses the light emitted from the object side telecentric lens 539 to an end face of the optical fiber 43. It is to be noted that the NA of the entire optical condensing device 505 is set smaller than the NA of the optical fiber 43 similarly as in the first embodiment.

With the second embodiment described above, since only parallel light from within light emitted from the plane light source 101 is introduced to the spectrometer 7 by the optical condensing device 505, such a situation that the density of light flux is dispersed in the sectional area of the taken-in light by the configuration of the optical condensing device as in the comparative example of FIG. 7 is eliminated. Further, since the measurement diameter d1 is fixed even if the distance between the plane light source 101 and the light measuring device 1 is fluctuated, the accuracy in measurement is improved. Further, the measurement diameter d1 can be set to an arbitrary dimension simply by adjustment of the magnitude of the diameter of the aperture 537a.

It is to be noted that, in the second embodiment described above, the object side telecentric lens 539 is an example of a telecentric lens, and the relay lens 541 is an example of a relay optical element.

Third Embodiment

Figure 11:
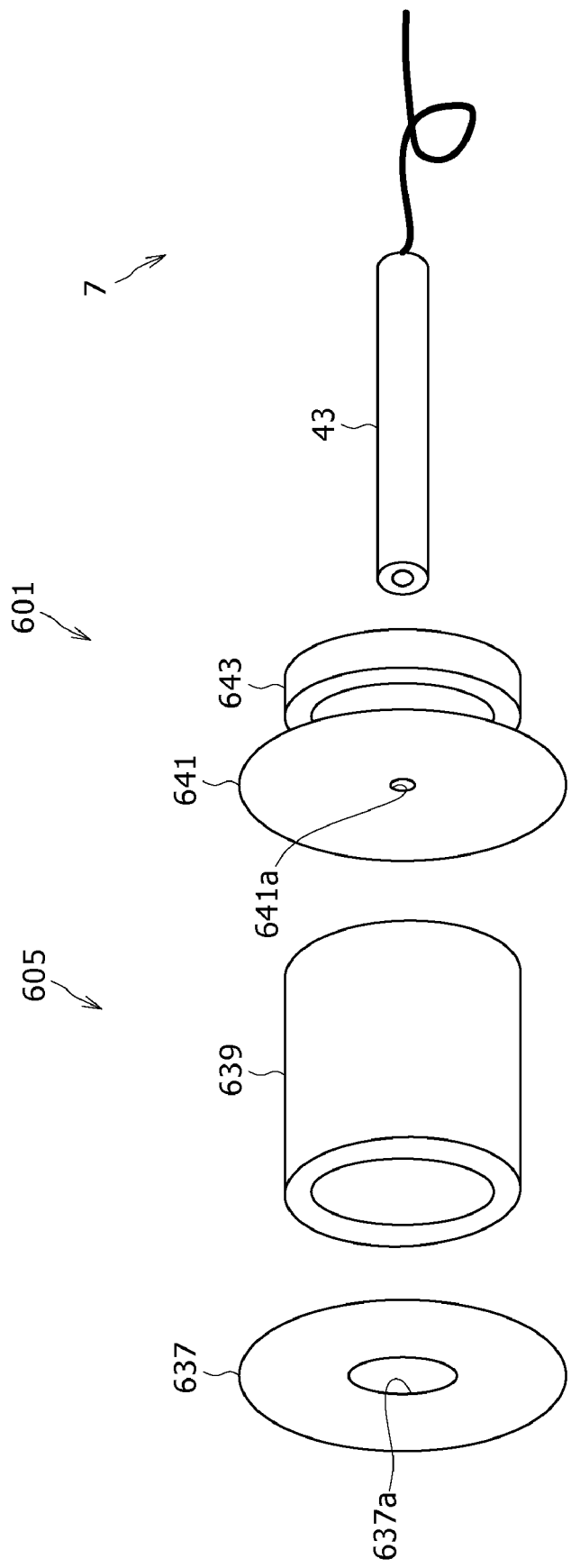
FIG. 11 is a perspective view showing a configuration of an optical condensing device of a light measuring device according to a third embodiment of the present invention.

FIG. 11 shows a general configuration of an optical condensing device 605 of a light measuring device 601 according to a third embodiment of the present invention. It is to be noted that the light measuring device 601 is common in configuration to the light measuring device 1 of the first embodiment except the configuration of the optical condensing device 605.

The optical condensing device 605 includes a first iris member 637 having formed therein a first aperture 637a for transmitting light from different portions of the plane light source 101 therethrough while defining the cross section of the light, and an objective lens 639 for condensing the light transmitted through the first iris member 637. The optical condensing device 605 further includes a second iris member 641 positioned on the rear side focal point of the objective lens 639 and having formed therein a second aperture 641a which transmits the light condensed by the objective lens 639 therethrough while defining the cross section of the light. The optical condensing device 605 further includes a relay lens 643 configured to condense the light transmitted through the second iris member 641 to the light receiving face of the spectrometer 7.

Figure 12:
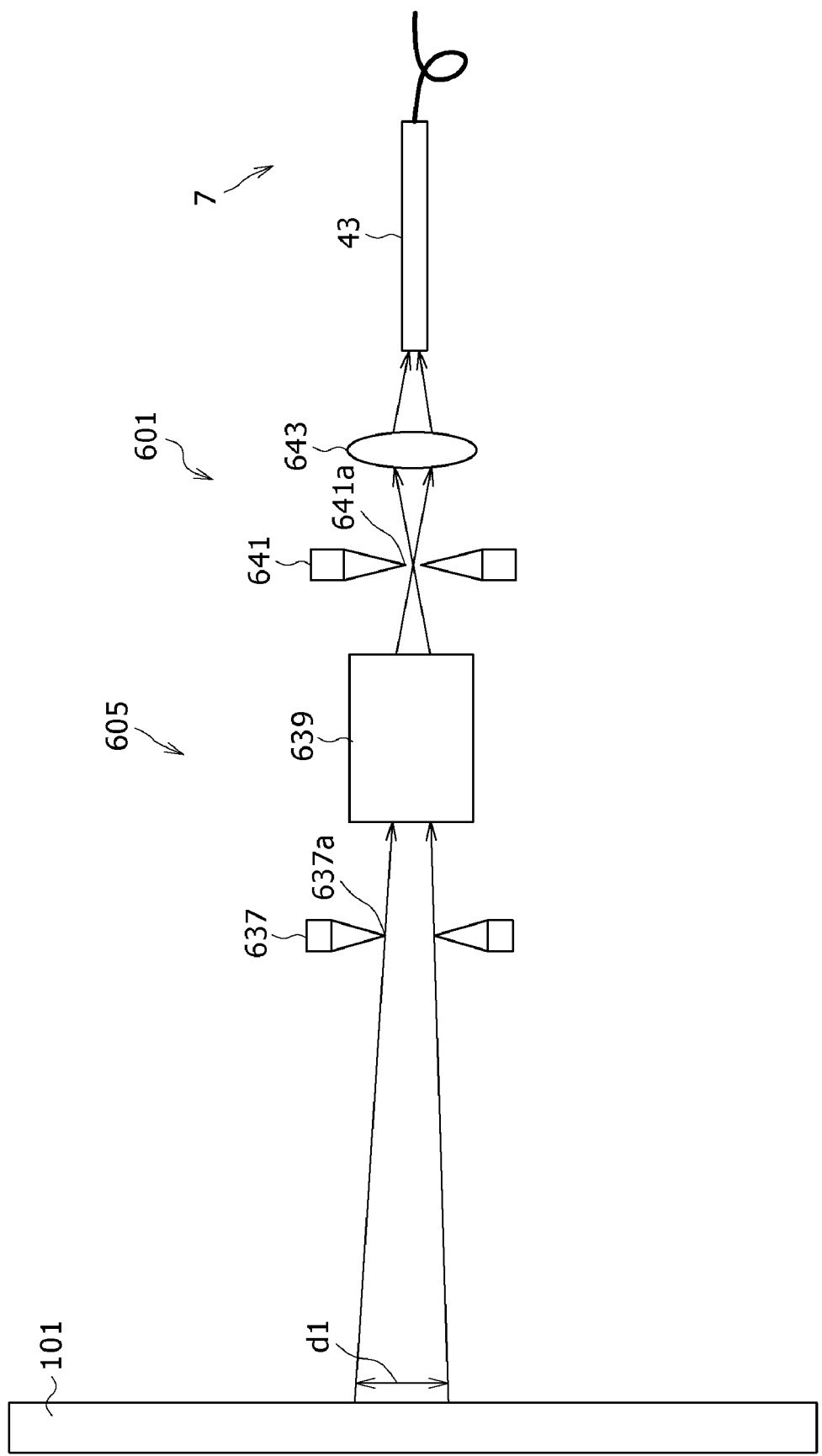
FIG. 12 is a view illustrating a light path in the optical condensing device of FIG. 11.

FIG. 12 shows a light path in the optical condensing device 605. It is to be noted that the spatial division device 3 is omitted in FIG. 12.

The optical condensing device 605 does not receive light from any other than the first aperture 637a. Since the second iris member 641 is disposed on the rear side focus, that is, on the focus on the outgoing side, of the objective lens 639, the objective lens 639 and the second iris member 641 cooperatively form an optical system which has an object side telecentric property. In particular, the objective lens 639 and the second iris member 641 transmit substantially parallel light from within incoming light therethrough. Accordingly, the measurement diameter d1 is substantially equal to the diameter of the first aperture 637a similarly as in the second embodiment.

Here, as the size of the second aperture 641a is decreased so as to become a pinhole of, for example, 0.3 to 0.6 mm, the incoming light transmitted through the second aperture 641a approaches parallel light. Meanwhile, since the amount of light flux which is transmitted through the second aperture 641a decreases, in the present embodiment, the size of the second aperture 641a is set to a certain size such as, for example, a size greater than the diameter of the light receiving face of the spectrometer 7, particularly to 1 mm or more.

In this instance, the solid angle is determined by the diameter of the first aperture 637a and the diameter of the second aperture 641a, and if the distance, that is, the measurement distance, between the plane light source 101 and the first aperture 637a is determined, then the measurement diameter d1 is determined. Accordingly, the measurement diameter d1 can be set to an arbitrary value by adjustment of the diameter of the first aperture 637a, the diameter of the second aperture 641a and the measurement distance. It is to be noted that, in the present embodiment, the energy of light to be taken into the spectrometer 7 is determined by the solid angle, and if the solid angle is fixed, then the luminance of the plane light source does not change depending upon the distance.

The relay lens 643 condenses the light emitted from the second iris member 641 to an end face of the optical fiber 43. It is to be noted that the NA of the entire optical condensing device 605 is set smaller than the NA of the optical fiber 43 similarly as in the first embodiment.

With the third embodiment described above, since substantially only parallel light from within light emitted from the plane light source 101 is introduced to the spectrometer 7 by the optical condensing device 605, such a situation that the density of light flux is dispersed in the sectional area of the taken-in light by the configuration of the optical condensing device as in the comparative example of FIG. 7 is suppressed. Further, since the variation of the measurement diameter d1 is small even if the distance between the plane light source 101 and the light measuring device 1 is fluctuated, the accuracy in measurement is improved. It is to be noted that, in the third embodiment, the objective lens 639 is an example of an objective optical element, and the relay lens 643 is an example of a relay optical element.

The present invention is not limited to the embodiments described above but may be carried out in various forms.

The light measuring device and the scanning optical system are not limited to those which involve two-dimensional scanning but may be of the type wherein one-dimensional scanning is carried out. Further, the plane light source of an object of measurement may be an elongated plane light source on which measurement of the entire light source can be carried out only by one-dimensional scanning. The plane light source is not limited to that for a display device. For example, the plane light source may be applied for illumination or applied as a plane light source used as a backlight of a display device. The quantity regarding light to be detected by the detector may be a physical quantity or a psychophysical quantity or may be a quantity other than the luminance or the chromaticity.

The condensing optical element, objective optical element and relay optical element are not limited to those which are formed using a lens. For example, they may otherwise be formed using a curved surface mirror or a combination of a curved surface mirror and a lens. Further, the condensing optical element, telecentric lens, objective optical element and relay optical element may be formed using a single optical element such as a single lens or may be a group of optical elements such as a group of lenses. The telecentric lens is not limited to the object side telecentric lens but may be a double-sided telecentric lens.

The aperture of the first iris member 37, 39, 537, 637 or 641 may be fixed or variable. Where the aperture is variable, the iris member may be of the type which has, for example, a plurality of apertures having different diameters from each other and formed on the same circumference such that the aperture to be inserted in the light path is changed by rotating the iris member. Or, the iris member may be formed from a combination of a plurality of iris blades as in the case of an iris member used in an image pickup device or the like. Also where the diameter of the aperture is fixed, the iris member may be mounted for replacement so that the diameter of the aperture becomes substantially variable.

Figure 13:
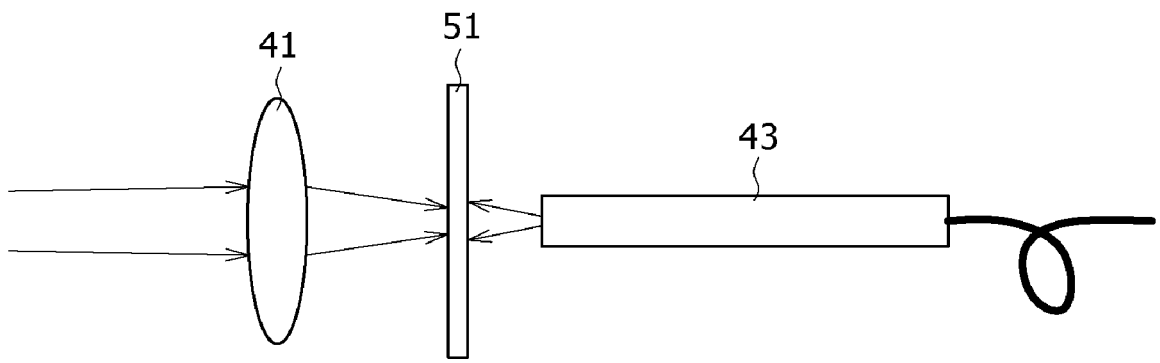
FIG. 13 is a view showing a modification to the optical condensing device.

As described above, the NA on the outgoing side of the entire optical condensing device is preferably smaller than the NA on the outgoing side of the detector. However, if it is difficult to make the NA on the outgoing side of the entire optical condensing device smaller than the NA on the incoming side of the detector, a diffuser 51 may be disposed between the condensing lens or relay lens and the detector as seen in FIG. 13. FIG. 13 shows an arrangement wherein the diffuser 51 is disposed in the first embodiment. Light condensed by the condensing lens 41 is projected to the diffuser 51. Then, if the diffuser 51 and the optical fiber 43 are disposed in a spaced relationship by a predetermined distance so that the projection region of the diffuser 51 may be included in an angle by which light can be guided by total reflection in the optical fiber 43, then light condensed by the optical condensing device can be introduced into the optical fiber 43 efficiently.

The detector may not necessarily include an optical fiber. For example, light condensed by the optical condensing device may be introduced or received directly into or by a slit of the spectrometer. Also in the case wherein the detector does not include an optical fiber, where the NA on the incoming side is defined, preferably the NA on the outgoing side of the optical condensing device is smaller than the NA on the incoming side of the detector. Where it is difficult to make the NA on the outgoing side of the optical condensing device smaller than the NA on the incoming side of the detector, preferably a light diffusing plate is disposed between the optical condensing device and the optical fiber.

In the light measuring device and the scanning optical system, various optical elements may be disposed at suitable positions in response to a particular condition such as the object of the use or the type of the object of measurement. For example, it is sometimes demanded for a light measuring device to be ready for various luminosities. In such an instance, the demand can be satisfied normally by setting the integration time of the detector such as a spectrometer to an appropriate value. However, where the plane light source does not emit light continuously but flickers, the integration time of the detector is sometimes limited. In such an instance, an ND (extinction) filter may be disposed in the light path. It is to be noted that, while the disposition location of the ND filter may be set suitably, preferably a plurality of different kinds of ND filters are disposed so as to be switchably used. The ND filter is naturally used also when light of a plane light source which is very bright such as a backlight is to be measured.

On the contrary, in the light measuring device and the scanning optical system, some optical element such as the relay lens 541 or 643 may be omitted suitably. For example, light condensed by a telecentric lens or an object lens may be introduced directly to the detector.

It should be understood by those skilled in the art that various modifications, combinations, sub-combinations and alterations may occur depending on design requirements and other factors insofar as they are within the scope of the appended claims or the equivalents thereof.

What is claimed is:

1. A light measuring device for measuring light from a planar object, comprising:
    a spatial division device configured to receive in succession light emanating from different portions of the planar object;
    an optical condensing device positioned optically downstream of the spatial division device and configured to condense the light from the different portions of the planar object received by the operation of said spatial division device; and
    a detector positioned optically downstream of the optical condensing device and configured to receive the light condensed by said optical condensing device and output a signal corresponding to the received light,
    wherein said optical condensing device includes:
        a first iris member having formed therein a first aperture which transmits the light from any of the different portions of the plane light source therethrough while defining a first cross section of the light;
        a second iris member having formed therein a second aperture which has an aperture area smaller than that of the first aperture and transmits the light transmitted through said first iris member therethrough while defining a second cross section of the light; and
        a condensing optical element configured to condense the light transmitted through said second iris member onto a light receiving face of said detector.

2. A light measuring device for measuring light from a planar object, comprising:
    a spatial division device configured to receive in succession light emanating from different portions of the planar object;
    an optical condensing device positioned optically downstream of the spatial division device and configured to condense the light from the different portions of the planar object received by the operation of said spatial division device; and
    a detector positioned optically downstream of the optical condensing device and configured to receive the light condensed by said optical condensing device and output a signal corresponding to the received light,
    wherein said optical condensing device includes:
        an iris member having formed therein an aperture which transmits the light from any of the different portions of the plane light source while defining a cross section of the light; and
        a telecentric lens configured to receive the light transmitted thereto from said iris member and be telecentric on the side thereof adjacent said iris member.

3. The light measuring device according to claim 2, further comprising a relay optical element configured to condense the light outgoing from said telecentric lens onto a light receiving face of said detector.

4. A light measuring device for measuring light from a planar object, comprising:

a spatial division device configured to receive in succession light emanating from different portions of the planar object;

an optical condensing device positioned optically downstream of the spatial division device and configured to condense the light from the different portions of the planar object received by the operation of said spatial division device; and a detector positioned optically downstream of the optical condensing device and configured to receive the light condensed by said optical condensing device and output a signal corresponding to the received light, wherein said optical condensing device includes:

a first iris member having formed therein a first aperture which transmits the light from any of the different portions of the plane light source while defining a first cross section of the light;

an objective optical element configured to condense the light transmitted through said first iris member; and a second iris member positioned at a focal point on the rear side of said objective optical element and having formed therein a second aperture which transmits the light condensed by said objective optical element while defining a second cross section of the light.

5. The light measuring device according to claim 4, further comprising a relay optical element configured to condense the light transmitted through said second iris member onto a light receiving face of said detector.

6. The light measuring device according to any of claims 1-5, further comprising a diffuser optically between said condensing device and said detector and configured to receive the light condensed by said optical condensing device and projected thereto, said detector being disposed in a spaced relationship by a predetermined distance from said diffuser such that a region of said diffuser in which light is projected is included in an angle with which said detector can take in the light.

7. A light measuring device for measuring light from a planar object, comprising:

a spatial division device configured to receive in succession light emanating from different portions of the planar object;

an optical condensing device positioned optically downstream of the spatial division device and configured to condense the light from the different portions of the planar object received by the operation of said spatial division device;

a detector positioned optically downstream of the optical condensing device and configured to receive the light condensed by said optical condensing device and output a signal corresponding to the received light:

a positioning light source capable of successively projecting light to the different portions of the plane light source in response to the operation of said spatial division device; and a control device capable of storing a position when the light from said positioning light source is projected on an index provided on the plane light source and configured to control said spatial division device such that the light from the different portions of the plane light source is successively deflected based on the stored position.

* * * * *